US011082347B2

(12) United States Patent
Dearth et al.

(10) Patent No.: US 11,082,347 B2
(45) Date of Patent: Aug. 3, 2021

(54) TECHNIQUES FOR REDUCING CONGESTION IN A COMPUTER NETWORK

(71) Applicant: Nvidia Corporation, Santa Clara, CA (US)

(72) Inventors: Glenn Dearth, Santa Clara, CA (US); Nan Jiang, Santa Clara, CA (US); John Wortman, Santa Clara, CA (US); Alex Ishii, Santa Clara, CA (US); Mark Hummel, Santa Clara, CA (US); Rich Reeves, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 36 days.

(21) Appl. No.: 16/277,349

(22) Filed: Feb. 15, 2019

(65) Prior Publication Data

US 2019/0297018 A1 Sep. 26, 2019

Related U.S. Application Data

(60) Provisional application No. 62/648,326, filed on Mar. 26, 2018.

(51) Int. Cl.
H04L 12/801 (2013.01)
H04L 12/26 (2006.01)
H04L 12/825 (2013.01)

(52) U.S. Cl.
CPC ........ H04L 47/127 (2013.01); H04L 43/0888 (2013.01); H04L 43/16 (2013.01); H04L 47/18 (2013.01); H04L 47/263 (2013.01); H04L 47/39 (2013.01)

(58) Field of Classification Search
CPC ....... H04L 47/127; H04L 47/18; H04L 47/39; H04L 43/0888; H04L 43/16; H04L 47/263; H04L 47/12; H04L 49/10; H04L 43/0817; H04L 49/30
See application file for complete search history.

(56) References Cited

U.S. PATENT DOCUMENTS

| 9,971,390 | B1* | 5/2018 | Becker | G06F 1/3212 |
| 10,257,098 | B1* | 4/2019 | Banse | H04L 47/125 |
| 2014/0010079 | A1* | 1/2014 | Monchiero | H04L 47/25 370/230 |
| 2016/0359973 | A1* | 12/2016 | Loh | G06F 3/067 |
| 2019/0052566 | A1* | 2/2019 | Leib | H04L 43/16 |

* cited by examiner

Primary Examiner — Jeffrey M Rutkowski
Assistant Examiner — Chae S Lee

(57) ABSTRACT

Multiple processors are often used in computing systems to solve very large, complex problems, such as those encountered in artificial intelligence. Such processors typically exchange data among each other via an interconnect fabric (such as, e.g., a group of network connections and switches) in solving such complex problems. The amount of data injected into the interconnect fabric by the processors can at times overwhelm the interconnect fabric preventing some of the processors from communicating with each other. To address this problem, techniques are disclosed to enable, for example, processors that are connected to an interconnect fabric to coordinate and control the amount of data injected so that the interconnect fabric does not get overwhelmed.

37 Claims, 7 Drawing Sheets

TECHNIQUES FOR REDUCING CONGESTION IN A COMPUTER NETWORK

CROSS-REFERENCE TO RELATED APPLICATION

This application claims the benefit of U.S. Provisional Application Ser. No. 62/648,326, filed by Glenn Dearth, et al. on Mar. 26, 2018, entitled "Network Injection Rate Limiting," commonly assigned with this application and incorporated herein by reference.

GOVERNMENT LICENSE RIGHTS

This invention was made with US Government support under Agreement H98230-16-3-0001 awarded by DoD. The US Government has certain rights in this invention.

TECHNICAL FIELD

This application is directed, in general, to an interconnect architecture and, more specifically, to a system and method that adaptively manage throughput in the interconnect architecture.

BACKGROUND

Systems with multiple processors are becoming common in a variety of industries as developers rely on more parallelism in applications. These systems use a fabric to connect multiple devices in parallel to solve very large, complex problems such as those you encounter in Artificial Intelligence (AI) computing. A collection of switches/crossbars that interconnects multiple devices, such as processing devices, memories and network devices, in a same system are referred as an interconnect fabric, and the interconnected devices are referred to as endpoints of the interconnect fabric.

SUMMARY

One aspect provides a method for managing throughput in an interconnect fabric that connects endpoints of a system. The method includes monitoring data requests between the endpoints over the interconnect fabric; and controlling an injection rate at which new data is injected into the interconnect fabric by limiting an ability of at least one of the endpoints to make a new data request over the interconnect fabric. Limiting the ability includes changing a refill rate at which a credit counter for the at least one endpoint is refilled based on an injection threshold.

Another aspect provides a device for managing throughput in an interconnect fabric that connect endpoints of a system. The system includes a pipeline configured to monitor data requests between said endpoints over said interconnect fabric; and an injection rate limiter configured to control an injection rate at which new data is injected into the interconnect fabric by limiting an ability of at least one of the endpoints to make a new data request over said interconnect fabric. Limiting the ability includes changing a refill rate at which a credit counter for the at least one endpoint is refilled based on an injection threshold.

BRIEF DESCRIPTION

Reference is now made to the following descriptions taken in conjunction with the accompanying drawings, in which.

DETAILED DESCRIPTION

Figure 1:
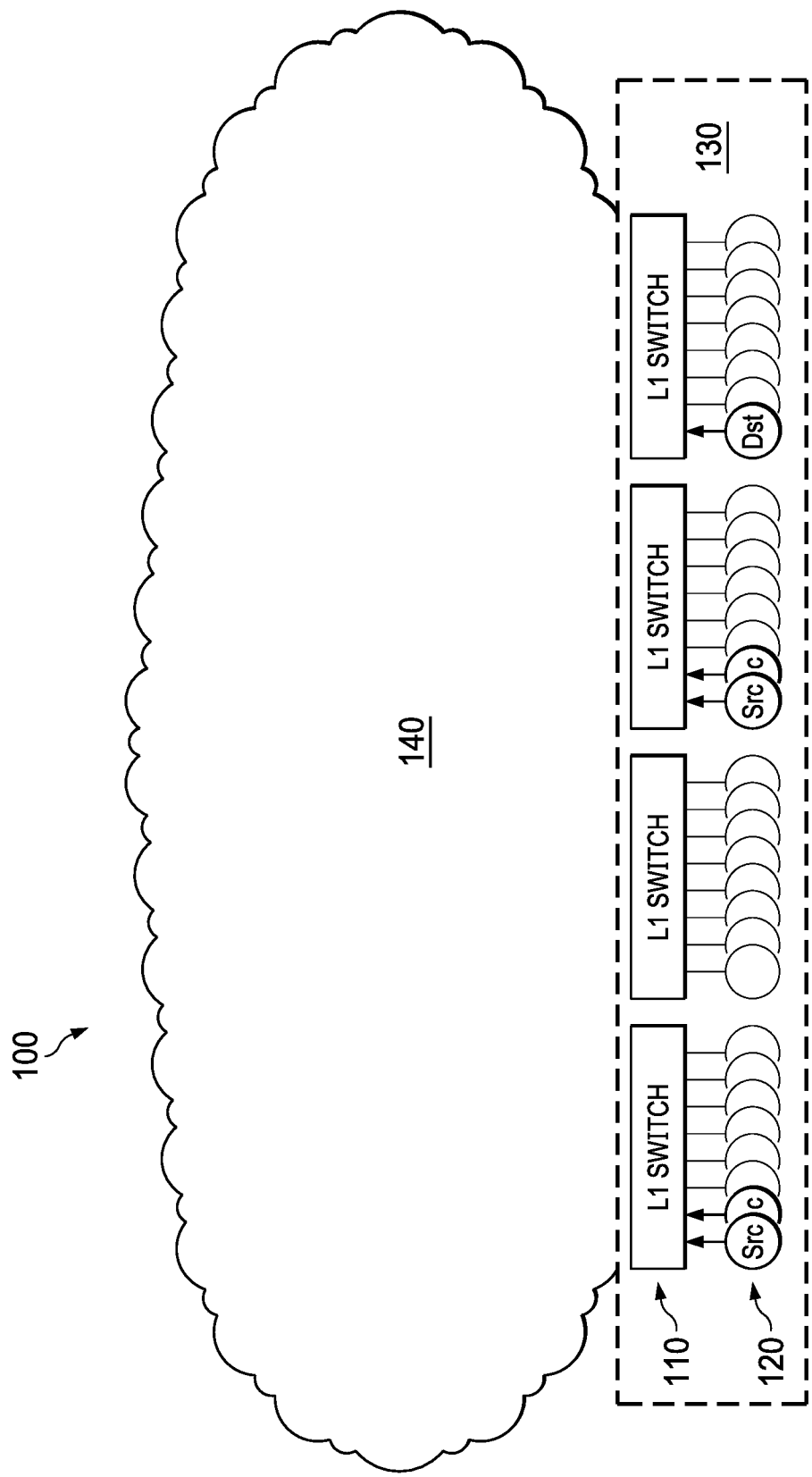
FIG. 1 is a diagram of an embodiment of an interconnect fabric implemented according to the principles of the disclosure.

Endpoints in an interconnect fabric can request to read and write data to any of the endpoints in the fabric. As each endpoint's ability to request data is independent of the others, the endpoints can be "greedy" in terms of their abilities to inject data requests into the fabric. In particular, when a lot of the endpoints become "greedy" in their requests at the same time, the total amount of data requested by the endpoints can create transient throughput spikes that flood the interconnect fabric.

This type of greedy behaviors can be identified in three examples. The first situation is when multiple read responses, a collective size of which is greater than the current interconnect fabric bandwidth, come back to a source endpoint at once. The second situation is when multiple data write requests, a collective size of which is greater than the current fabric bandwidth, are sent to a target endpoint at once. And the third situation is when an endpoint receives a read response and a write request at once, a collective size of the response and request being greater than the current fabric bandwidth. When these situations occur, it not only slows down the current and future traffic in the interconnect fabric but also creates large bandwidth imbalances in the interconnect fabric traffic, such as between types of traffic, e.g., responses and requests, and between competing source endpoints.

Currently, the interconnect fabric is typically controlled using a "leaky bucket" type of a method that limits the rate at which data is injected into the fabric ("injection rate") when the interconnect fabric becomes flooded/saturated. Such a method is not capable of anticipating and avoiding potential transient throughput spikes and floods and is also poor at handling them as it can only handle them using predefined parameters that are not adaptive to the changing condition of the fabric.

What is desired is an injection rate limiting (IRL) mechanism that can observe the changing fabric condition and adapt its injection rate to the changing fabric condition so that it can prevent and handle adverse situations like transient throughput spikes and floods. Also desired is an IRL mechanism that can manage "greedy" behaviors of the endpoints so that the bandwidth of the interconnect fabric is fully utilized without sacrificing its performance.

Introduced herein is an IRL method and system ("IRL concept") that manage the injection rate by controlling endpoints' abilities to make new data requests over an interconnect fabric based on the changing condition of the interconnect fabric. Since the endpoints' "greedy" behaviors are direct results of their independent abilities to make new data requests, the introduced IRL concept makes the endpoints' abilities no longer independent by tying them to the changing fabric condition. Also by tying the endpoints' abilities to the changing fabric condition, the introduced IRL concept effectively adapts its injection rate to the changing fabric condition. The introduced IRL concept controls each endpoint's ability to make a new data request by controlling a refill rate of its request/response credit counter.

The introduced IRL concept can operate in two different modes. In the first "static IRL" mode, the introduced IRL concept controls an endpoint's ability to make a new data request using the endpoint's credit counter and a data injection threshold. The static IRL compares a randomly generated number to the data injection threshold and increments the credit counter when the randomly generated number is less than the injection threshold. The static IRL allows a new request packet to be injected into the interconnect fabric when the credit counter has credits more than or equal to a packet maximum transmission unit. Thus for the static IRL, both the refill rate of the credit counter and the data injection are static, allowing more stable operation of the interconnect fabric and prevention of interference between the endpoints. Using the randomly generated number also allows the static IRL to be pseudo-non-deterministic and avoid the systematic synchronization effect between the endpoints.

In the second "adaptive IRL" mode, the introduced IRL concept monitors the congestion level of the interconnect fabric and controls an endpoint's ability to make a new data request based on the congestion level of the interconnect fabric. The adaptive IRL determines the congestion level of the interconnect fabric by monitoring the congestion feedback and the local congestion estimate. The congestion feedback represents the current congestion of the interconnect fabric, and the local congestion estimate represents the transaction latency. The adaptive IRL changes its data injection threshold based on the interconnect fabric congestion level and increments the credit counter based on a comparison between a randomly generated number and the data injection threshold. The adaptive IRL thus changes the rate at which the credit counter is refilled adaptive to the congestion level of the interconnect fabric. This adaptability allows the bandwidth of the interconnect fabric to be fully utilized without sacrificing the endpoints' performance, improving its efficiency and performance of the interconnect fabric. Also, using the randomly generated number allows the adaptive IRL to be pseudo-non-deterministic and avoid the systematic synchronization effect between the endpoints.

The IRL concept can also control the injection of data into the interconnect fabric by employing multiple thresholds and changing the amount by which the credit counter is refilled based on the thresholds. For example, when the amount of the data that has been requested by a given endpoint exceeds a certain threshold, i.e. crosses a first threshold (TH) on an upward trajectory, the amount by which the credit counter is refilled (refill amount) is reduced, and when the amount falls below another threshold, i.e., crosses the second TH on a downward trajectory, the refill amount is restored to its original value. The refill amount is changed based on the particular threshold the requested amount crosses and the trajectory in which it crosses.

FIG. 1 illustrates a system diagram of an embodiment of an interconnect fabric 100. The term "interconnect fabric" refers to a network of devices, such as switches, that connect multiple endpoints/processors that communicate with one another using a same communication protocol or link such as NVLink™ provided by NVIDIA® Corporation of Santa Clara, Calif. The interconnect fabric should not be confused with other widespread networks such as a wireless network that can connect multiple systems and/or devices/nodes.

In the illustrated embodiment, the interconnect fabric 100 includes a network of switches represented by switches 110 that connect multiple endpoints/processors 120 over a communication protocol. An area 130 covering connections between each endpoint 120 and the respective network of switches 110 is called "edge" of the interconnect fabric 100 and an area 140 that covers connections between the switches 110, e.g., L1 switches, and other switches (not shown), e.g., L2 switches, is called "core" of the interconnect fabric. The IRL mechanisms of the current disclosure take place in the edge of the interconnect fabric 100. The interconnect fabric 100 and the endpoints 120 can be part of a server or servers, such as in a data center. The endpoints 120 can be within a single server, within multiple servers within a single rack, or distributed across multiple server racks. The switches 110 can be NVSwitches of NVIDIA®, and the endpoints 120 can be processing units such as graphics processing units (GPUs) and central processing units (CPUs), storage units such as memories, and/or networking units such as network interface cards.

In the illustrated embodiment, some of the endpoints 120 are labeled as source (Src) endpoints and some are labeled as target (Dst) endpoints. The source endpoints are endpoints that are making requests to other endpoints and the destination/target endpoints are endpoints to which such requests are directed. Although they are labeled as such, each of the endpoints 120 can make either read or write request to any of the endpoints connected to the interconnect fabric and they can also respond to any of the endpoints in the interconnect fabric. As mentioned above, the endpoints 120 can make a request when they have sufficient request credits, which are dispensed when they make a request.

Figure 2:
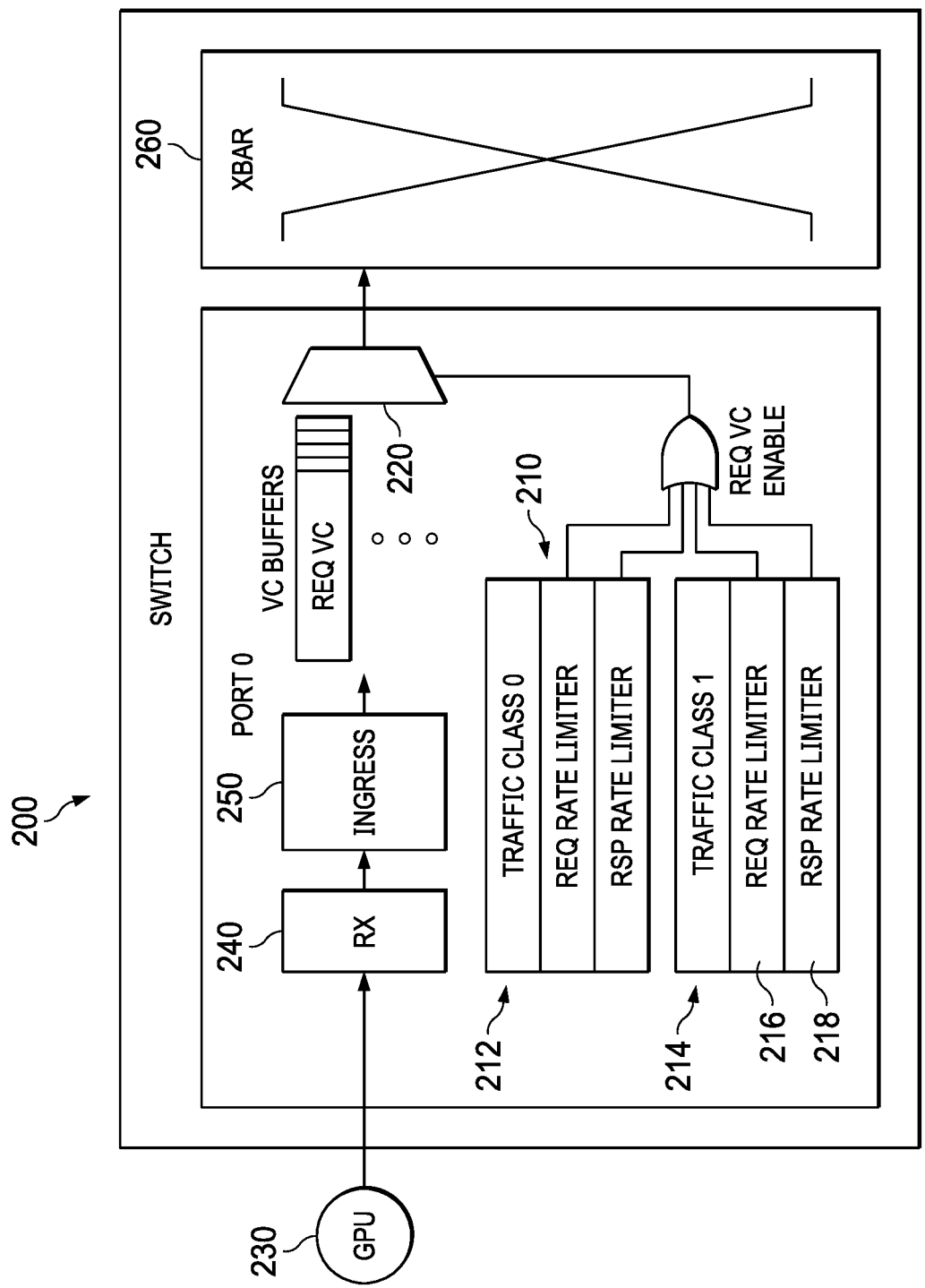
FIG. 2 is a block diagram of an embodiment of a switching device implemented according to the principles of the disclosure.

FIG. 2 illustrates a block diagram of an embodiment of a switching device 200, such as one of the switches 110 in FIG. 1, that is coupled to an interconnect fabric. The switching device 200 is connected to an endpoint, a GPU 230 in the illustrated embodiment. The device 200 includes a receiver (RX) 240, an ingress pipeline 250, an IRL module 210, a virtual channel (VC) Buffers 220, and a crossbar 260.

The receiver 240 is configured to receive packets, e.g., response and request packets, from the endpoint 230 and pass them on to the ingress pipeline 250. The ingress pipeline 250 is configured to receive request packets from the receiver 240 and moves them to the IRL module 210 and the VC buffers 220. The VC buffers 220 are connected to the crossbar 260, which transmits request packets from the endpoint 230 to other endpoint in the interconnect fabric and receive response packets therefrom. In the illustrated embodiment, the VC buffers 220 include a request VC, independent hardware crediting mechanism, such as a set of queues that facilitates request packet movement.

While the IRL module 210 may be present in any of the switching devices of the interconnect fabric, only those of devices that are located at the edge of the interconnect fabric are enabled. The IRL module 210 has two IRL instances 212, 214 that are associated with a same port, e.g., Port 0, of the switching device 200 and control the injection rates of different classes of traffic. Based on its class, each packet interacts with only one of the IRL instances 212, 214. A packet's class may be based on various factors, such as a packet's priority and/or destination. The class is added to the packet using signal from the route tables (not shown). The IRL instances 212, 214 may use independent injection rate limiting mechanisms that can interact with each other. In one embodiment, the injection rate limiting mechanisms interact using a policy that limits injection based on which IRL instance is triggered first.

Each IRL instance 212, 214 includes two separate submodules 216, 218 that independently rate limits read and write transactions, respectively, for greater flexibility and improved congestion control. The request submodule 216 (Req Rate Limiter) controls write transactions by throttling request bandwidth as write transactions can carry large data payload on the requests. The response submodule 218 (Rsp Rate Limiter) controls read transactions by throttling response bandwidth because read transactions can carry large data payload on the response. Although independent, both the request submodule 216 and the response submodule 218 control the respective bandwidth at the source endpoint by throttling request packets; whereas a payload of a request packet is examined in the request submodule 216, a payload of a response packet to be generated by a request is examined in the response submodule 218. Albeit indirect, throttling request packets at the source endpoint is preferred for the response submodule 218 because directly throttling response packets at the target endpoint can create unnecessary blocking between responses returning to a congestion-free source endpoint and those that are returning to a congested source endpoint. The outputs of the submodules 216, 218 are OR'ed such that the request virtual channel 220 can be throttled by one of the submodules.

Using the submodules 216, 218, the bandwidth of the interconnect fabric is controlled in two ways. The first way is the static IRL, which controls the bandwidth using a "leaky bucket" mechanism. The static bandwidth control may be programmed by software to statically restrict the bandwidth below a certain level. The second way is the adaptive IRL, which controls the bandwidth adaptive to the congestion level of the interconnect fabric.

The adaptive bandwidth control has two separate congestion detection and feedback mechanisms that feed the control algorithm. The first mechanism is a Last-hop Explicit Congestion Notification (ECN) that utilizes a congestion feedback bit from the interconnect fabric carried on a response header, and the second mechanism is a Little's Law Estimator that performs a local estimation of the congestion by calculating transaction latency. The two mechanisms work jointly for the adaptive bandwidth control. The Last-hop ECN is illustrated in FIGS. 3-4, and the Little's Law Estimator is illustrated in FIG. 5.

Figure 3:
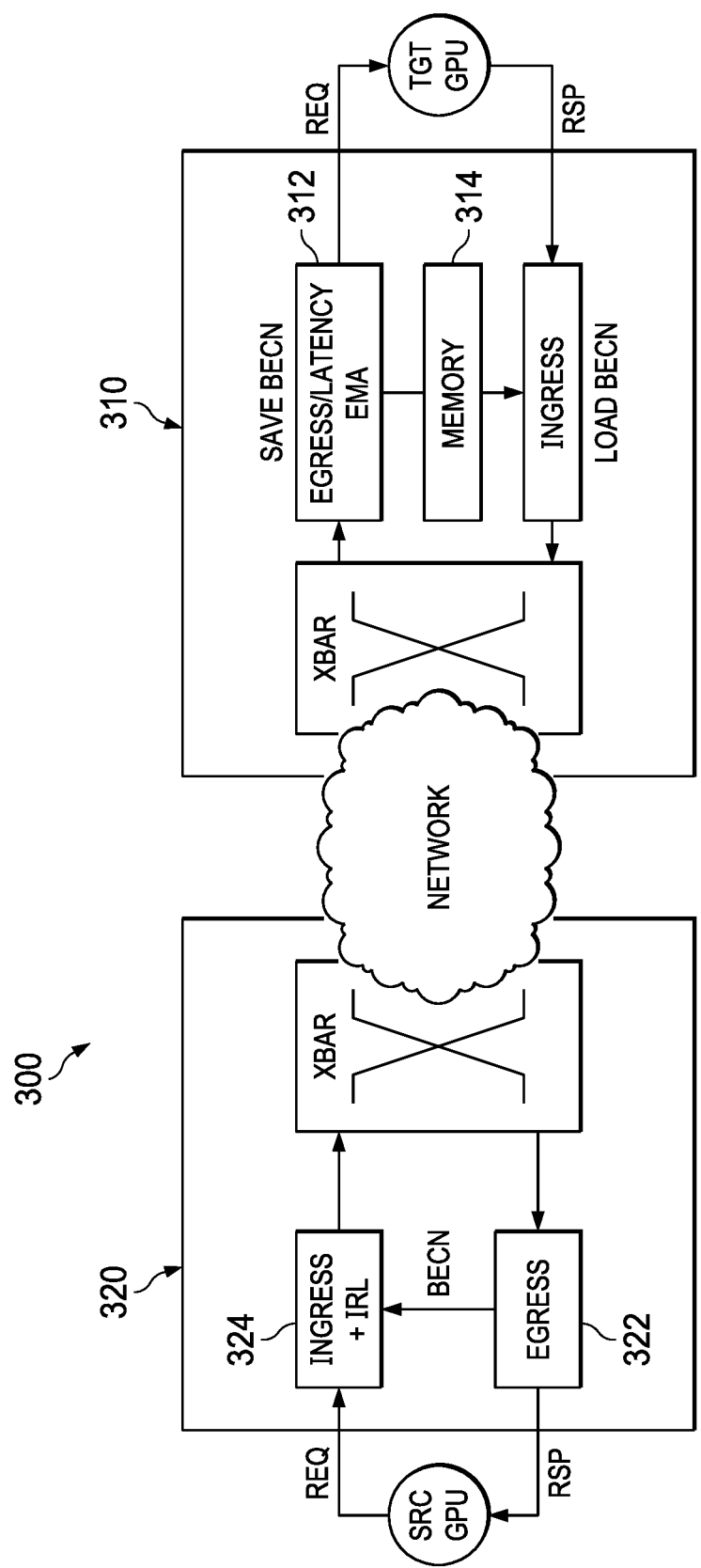
FIG. 3 is a block diagram of an embodiment of a Last-hop Explicit Congestion Notification (ECN) implemented according to the principles of the disclosure.

FIG. 3 is a block diagram of an embodiment of a Last-hop ECN 300 at a network level. In the illustrated embodiment, when a request packet arrives at a last-hop switch 310 before reaching its target endpoint (TGT GPU), the congestion information is detected using a Latency Exponential Moving Average (EMA) block 312, and saved as a Backward Explicit Congestion Notification (BECN) bit in a memory 314, such as an internal switch memory, that tracks/maintains transaction state. A BECN field is added to a response packet (Rsp) to transport the congestion information from the last-hop switch 310.

When the target endpoint sends the response packet, the value of the BECN bit saved in the memory 314 is transferred to the response header. It is understood that the BECN bit is not modified anywhere else in the interconnect fabric. At the egress pipeline 322 of a first-hop switch 320, the response packet's BECN bit is extracted by the egress pipeline 322 and passed along to the IRL modules in the ingress pipeline 324.

Figure 4:
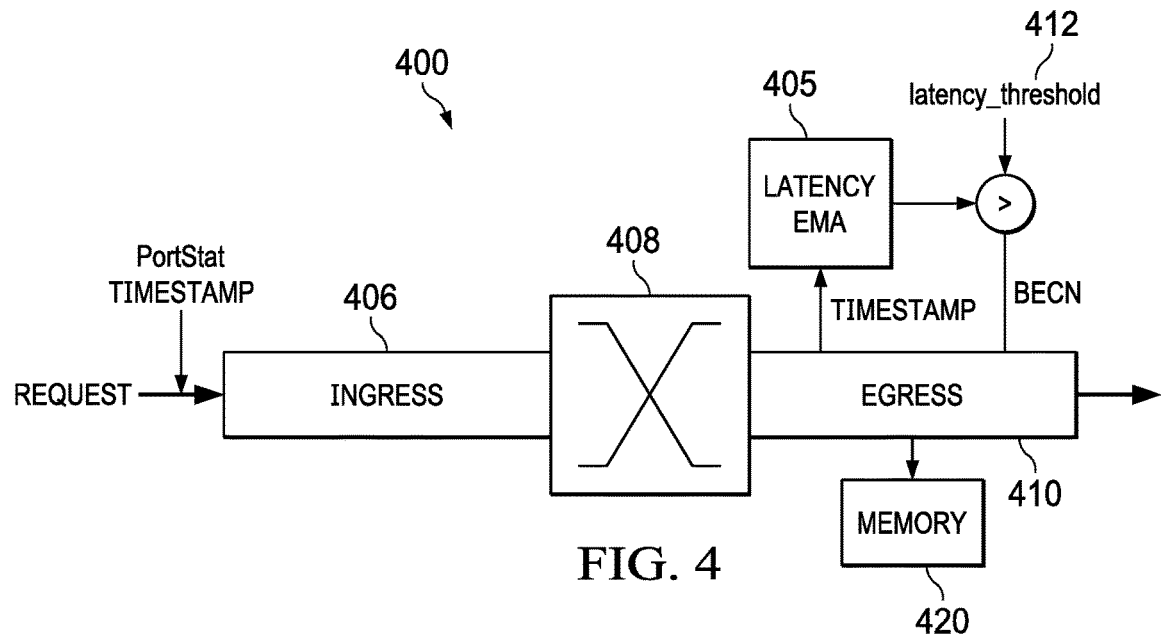
FIG. 4 is a block diagram of an embodiment of a Latency exponential moving average block implemented according to the principles of the disclosure.
Figure 5:
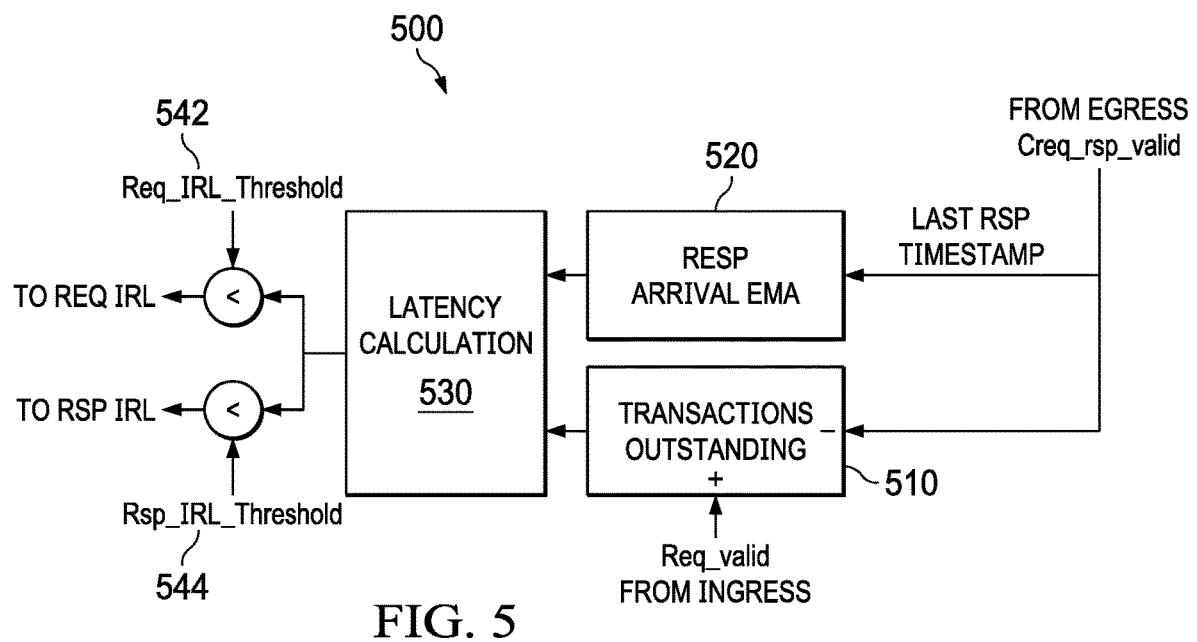
FIG. 5 is a block diagram of an embodiment of a Little's Law Estimator implemented according to the principles of the disclosure.

FIG. 4 is a diagram of Last hop EMA 400 that includes a Latency EMA block 405, such as 312 in FIG. 3. The Latency EMA 405 detects fabric congestion by calculating the latency average $L_{avg}$ observed between an ingress pipeline 406 and an egress pipeline 410 of a last-hop switch, such as 310 in FIG. 3, and comparing it to a programmable latency threshold (latency_threshold) 412. The latency average is measured by timestamping a packet in the ingress pipeline 406 and determining the transit time through a crossbar (Xbar) 408 to the egress pipeline 410 by finding the difference of the timestamp in the packet and the global switch time. In the illustrated embodiment, the PortStat mechanism is used as input to the averaging algorithm. The PortStat mechanism is a module in the port of the switch that measures a packet's latency through the switch. This latency measurement is just through the current switch regardless a packet's previous journey in the fabric.

Exponential moving average (EMA) algorithm, Equation 1 below, is used to calculate latency average.

$$L_{avg}=L_{avg}+(L-L_{avg})>>S \qquad \text{Equation 1}$$

In Equation 1, L represents the packet timestamping mechanism measured latency, and S represents programmable shift.

If the value of the $L_{avg}$ is greater than the value of the latency threshold (latency_threshold), then BECN bit is set to 1, otherwise BECN bit is set to 0. The latency threshold 412 is a programmable threshold that depends on factors such as source traffic profiles, target response sensitivity, and general fabric properties such as size and expected traffic patterns. The BECN bit is saved in the egress memory 420, such as 314 in FIG. 3, with other header information, and applied to response packets at the ingress pipeline from the target endpoint. Since the latency measurement is only active on egress pipeline 410 of the last-hop switch, only a single latency EMA module is required for the request virtual channel.

FIG. 5 is diagram of the Little's Law Estimator 500 performing a local estimation of congestion by calculating transaction latency. The transaction latency $L_{trans}$ is calculated using Equation 2 as shown below:

$$L_i=N_iT_i \qquad \text{Equation 2}$$

In Equation 2, L represents transaction latency, N represents transaction/request outstanding, and T represents average inter-arrival time.

A simple counter 510 tracks the number of outstanding transactions, regardless of the size of the transactions. The counter 510 is incremented when the first-hop switch sends a request packet and is decremented when the first-hop switch receives a response packet. When near saturation, the counter backpressures the request packet virtual channel.

An EMA algorithm block 520 is used to calculate the average time between response arrivals, i.e., "average inter-arrival time." The EMA algorithm block 520 smooths the arrival times. The block 520 uses a register to store the current average inter-arrival time. The register is set to zero on reset to indicate that there was no last response. This initial condition prevents the first response from generating a very large time.

On receiving a valid response header, the average inter-arrival time is calculated using Equation 3:

$$T_{i+1} = T_i + (t - T_i) \gg S \quad \text{Equation 3}$$

In Equation 3, t represents time since last response and S represents EMA shift.

When transaction outstanding N is zero, the counter is reset.

The multiplications in Equation 2 can be avoided by an iterative method to save hardware complexity. The iterative method uses an accumulator that increments by $N_i$ when no response arrives. Let t be the time between the arrival of two responses, the accumulator during the time t accrues a value of $N_i t$. For arriving requests, the transaction latency 530 is updated as:

$$L_{i+1} = (N_i + 1)T_i \quad \text{Equation 4,}$$

which can be rewritten as:

$$L_{i+1} = L_i + T_i \quad \text{Equation 5,}$$

using Equation 2).

For arriving responses, the transaction latency can be calculated as:

$$L_{i+1} = (N_i - 1)T_{i+1} \quad \text{Equation 6}$$
$$= N_i T_{i+1} - T_{i+1},$$

which can be rewritten as:

$$= (N_i)(T_i + (t - T_i) \gg S) - T_{i+1} \quad \text{Equation 7}$$
$$= N_i T_i + (N_i t - N_i T_i) \gg S - T_{i+1}$$
$$L_{i+1} = L_i + (N_i t - L_i) \gg S - T_{i+1},$$

using Equations 2) and 3) and the value accrued in the accumulator $N_i t$.

On cycles when both request/response header arrives, the equations for the request and response are combined and the EMA term cancels out:

$$L_{i+1} = L_{i+1} + (N_i t - L_{i+1}) \gg S \quad \text{Equation 8}$$

After the accumulator is used for the transaction latency update in Equations 7) and 8), the accumulator's value is reset to $N_1$. The calculated transaction latency is compared to respective programmable threshold 542, 544 to generate a congestion signal to feed respective, e.g., response or request, IRL submodules.

It is understood that under certain circumstances, a switch can collapse multiple responses in the fabric into a single response, and due the iterative latency computation, accurately measuring response inter-arrival times of a collapsed response can be difficult. As such, in one embodiment, a un-collapse mechanism is provided for each IRL instance. The un-collapse mechanism employs a counter that is the same size as the Little's law outstanding transaction counter. On a valid response, the number of collapsed responses in the header is added to a collapsed response counter. The collapsed response's BECN bit is directly sent to the IRL submodules without going through un-collapsing since the number of BECN bits received is not counted. On every programmable cycle, the counter sends 1 uncollapsed response to the IRL and decrements by 1 until the counter reaches 0.

Figure 6:
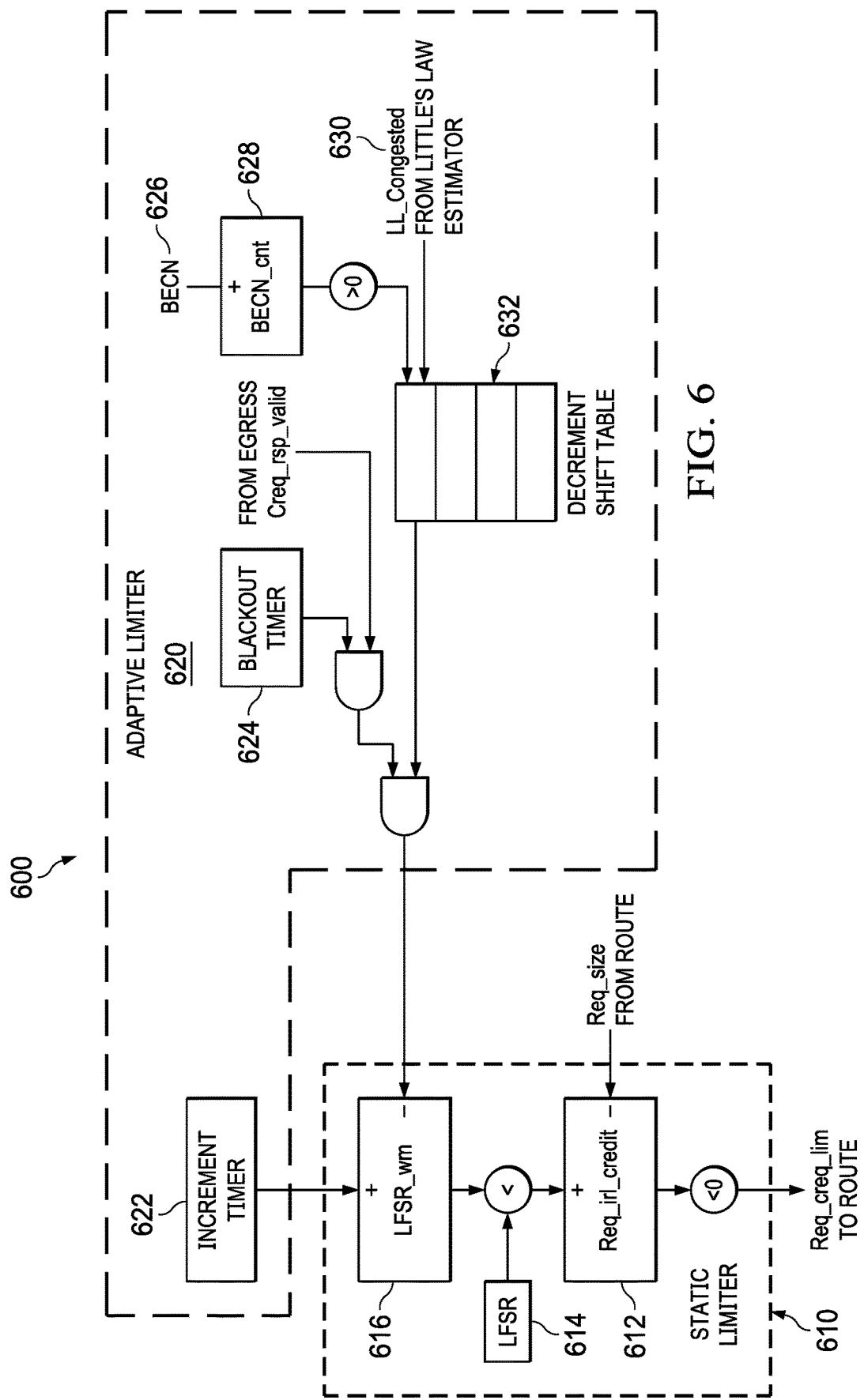
FIG. 6 is a block diagram of an embodiment of an injection rate limiting (IRL) submodule implemented according to the principles of the disclosure.

FIG. 6 illustrates an embodiment of a request IRL submodule 600 that includes a static limiter 610 and an adaptive limiter 620. As the design of both request and response IRL submodules are similar, only a request IRL submodule is illustrated. The IRL submodules are enabled at devices located at an edge of an interconnect fabric, such as the switch 200 in FIG. 2.

The static limiter 610 limits an ability of an endpoint to send a new data request using a credit counter (req_irl_credit counter) 612 that is refilled at a static refill rate. The refill rate of the credit counter 612 is achieved by comparing the output of a random number generator (RNG) 614 (LFSR) against a data injection threshold (LFSR_wm) 616.

When a request packet is injected into a request virtual channel, a number of request credits corresponding to the size of the request packet and its response are subtracted from respective credit counters of the source endpoint. For example, for a read request packet, a number of request credits corresponding to the size of the read request packet and a number of response credits corresponding to the size of a read response packet to be generated, which includes the size of data to be read from a target endpoint, are subtracted from a request credit counter and a response credit counter of the source endpoint, respectively; and for a write request packet, a number of request credits corresponding to the size of the write request packet, which includes the size of data to be written to a target endpoint, and a number of response credits corresponding to the size of a write response packet to be generated are subtracted from a request credit counter and a response credit counter of the source endpoint, respectively.

When a value of the credit counter 612 is less than packet maximum transmission unit (MTU), then the static limiter 610 throttles the request virtual channel, preventing new data request packets from being injected into the interconnect fabric. When a value of the credit counter 612 is greater than or equal to the packet MTU, the static limiter 610 allows a new data request packet to be injected into the interconnect fabric. It is understood that the MTU represents the size of the largest protocol data unit (PDU) that can be communicated in a single network layer transaction.

On every cycle, a value of the RNG 614 is compared against the data injection threshold 616. If the value from the RNG 614 is less than the threshold 616, the credit counter 612 is incremented by N, up to a programmable maximum value (not necessarily same as initial value). The increment size, N, does not need to be programmable, but depends on how packet size is measured. For example, internal packet flit sizes can be different than external on-the-wire flit sizes as long as the tracking measurement size is consistent with the point where the measurement is observed and control applied. This accounts for clock difference between switch core and NVlink. If the value of RNG 714 is greater than the threshold, the credit counter is maintained as is.

The adaptive limiter 620 adaptively limits an ability of an endpoint to make a new data request based on a congestion level of the interconnect fabric. The adaptive limiter 620 leverages the credit counter 612 and the data injection threshold 616 of above. Whereas the data injection TH 616 remains unchanged during operation of the static limiter 610, the adaptive limiter 620 changes the value of the data injection TH 616 based on the congestion level of the interconnect fabric. Changing the data injection TH 616 changes the rate at which the credit counter 612 is refilled ("refill rate") as the credit counter 612 is refilled only when a value generated by the RNG 614 does not cross the data injection TH 616 as described above. When the data injection TH 616 increases, the refill rate increases since it is less likely that the value of the RNG 614 would cross the data injection TH 616, and when the data injection TH 616 decreases, the refill rate decreases since it is more likely that that the value of the RNG 614 would cross the data injection TH 616.

An increment timer 622 is used to periodically increase the data injection TH 616. The increment timer 622 periodically increases the data injection TH 616 by a programmable amount, e.g., 1, approximately every N cycle. The data injection TH 616 is bound by a programmable maximum value, which may be less than 100% of the available bandwidth. In one embodiment, N is implemented using another TH comparison. Using an additional TH comparison introduces some randomness to the short-term increment rate while maintaining a fixed long-term rate to help with oscillatory behavior of the system. For example, a 16-bit RNG has a period of 65535 cycles. By setting the comparison TH to 2184, this watermark-based timing module will fire on average every 65535/2184=30 cycles.

It is understood that utilizing random number generation in the processes of incrementing the credit counter 612 and the data injection TH 616 incorporates short-term randomness into the processes while still obeying long-term goal (e.g. for the observed injection rate of 30%, while 3 flits may not always be injected for every 10 cycles, 30 flits will be injected, on average, for every 100 cycles). The introduced short-term randomness makes both processes pseudo-non-deterministic as opposed to deterministic and allows them to avoid any systematic synchronization effect between nodes (e.g. 2 nodes are throttled to 50% injection rate, but then both choose to idle or inject packet at the same time). The data injection TH 616 is decremented using a blackout timer (BT) 624. The BT 624 controls the decrement of the injection TH 616 based on the congestion feedback and the output of Little's Law (LL) Estimator. The congestion feedback is a BECN bit 626 calculated by a last hop ECN as 300 in FIG. 3 and transported by a response packet, and the output of the LL estimator is a LL signal 630 from a LL Estimator as 500 in FIG. 5.

The BT 624 counts down by a programmable amount per cycle. When the BT 724 is greater than 0, the IRL is in a blackout period, and the arriving response packets do not cause any decrement. During the blackout period, a BECN counter 628 (BECN_cnt) is incremented by 1 for every arriving response with BECN bit 626 set at 1. The BECN counter 628 saturates at a max value.

When the BT 624 reaches 0, the blackout period is over. The BT 624 stays at 0 until the arrival of the next response packet. The values of the BECN counter 628 and the Little's law signal 630 are used, e.g., concatenated, to look up a decrement shift value S. The new value for the data injection TH 616 is calculated as:

Injection TH new=Injection TH old−(Injection TH old>>S)   Equation 9

The Little's law signal 630 is the local congestion estimate calculated by a Little's Law estimator, such as 500 in FIG. 5. The local congestion estimate is determined by a comparison between programmable local congestion threshold and a transaction latency, which is calculated using a number of outstanding transactions and response inter-arrival time, i.e. an average time between arrivals of responses to data request packets. In one embodiment, the concatenation of the values generates a 2-bit index to look up a 4-entry decrement shift table 632. The table 632 may be programmed with a shift values ranging from, for example, 3 to 9. Once the data injection TH 616 is decremented, both the BT 624 and BECN counter 628 are reset.

Figure 7:
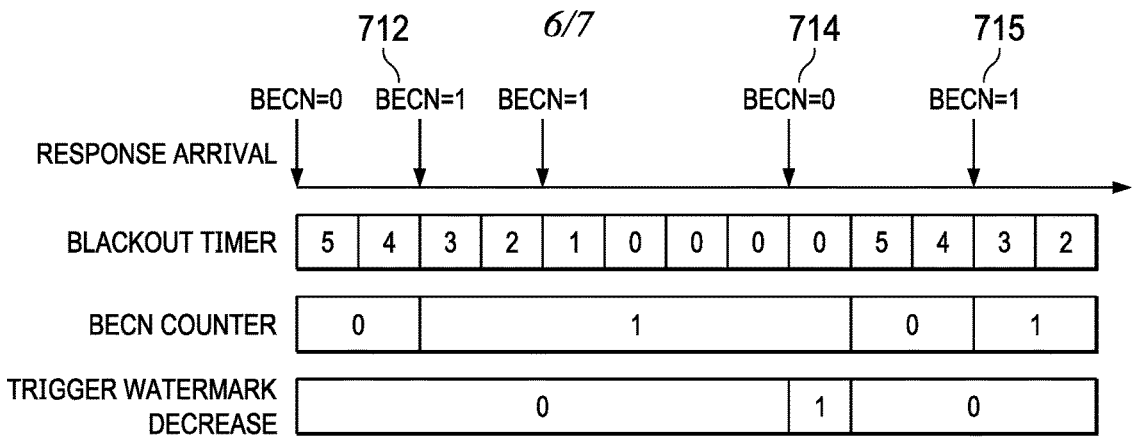
FIG. 7 is a diagram of a data injection threshold decrement according to the principles of the disclosure.

FIG. 7 illustrates an example of the data injection TH 616 decrement. In the illustrated example, the BT 624 counts down from 5 to 0. Until it reaches 0, the response arrivals do not cause any decrement. They, however, increment the BECN counter 628. In the illustrated example, the BECN counter 628 increments to 1 when the second response 712 arrives and remains saturated at 1, which is the max value for the example.

When the fourth response 714 arrives, the BT 624 is expired and the data injection TH decrement is triggered. The arrival of the fourth response 714 also resets both the BT 624 and the BECN counter 628 as shown. When the fifth response 715 arrives, the arrival does not decrement the data injection TH 616 since the BT 624 has not reached zero. Instead, it increments the BECN counter 628.

Figure 8:
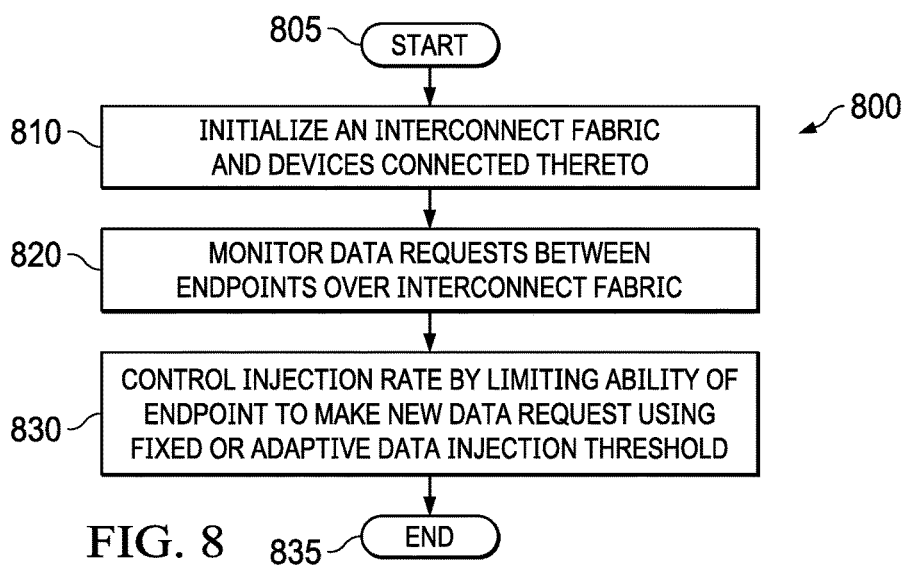
FIG. 8 is a flow chart of an embodiment of an IRL method carried out according to the principles of the disclosure.

FIG. 8 illustrates a flow diagram of an embodiment of the injection rate limiting method 800. The method 800 may be performed by a switching device located at an edge of the interconnect fabric, such as the switch 200 in FIG. 2. The method 800 starts at step 805.

At step 810, the interconnect fabric and endpoints connected thereto are initialized. The step 810 includes enabling switching devices that are located at the edges of the interconnect fabric to perform the injection rate limiting. Also included in the step 810 are parameterizing the interconnect fabric and selecting an IRL mode based on the parameters of the interconnect fabric.

One of the parameters of the interconnect fabric is a "base" source-to-destination fabric latency. The base latency is a reference latency to which the IRL is applied. In one embodiment, the base latency is accessed from configuration parameter tables using the switch driver. As the base latency may be different for each fabric topology, maintaining the tables for all possible fabric topologies in software can present a code maintenance issue. As such, in the illustrated embodiment, the base latency is determined using an IRL latency ping mechanism.

With the built-in hardware IRL ping mechanism, the hardware can "range find" the base latency for the current topology when the interconnect fabric is idle, e.g., when the interconnect fabric is servicing primarily ping packets to measure network latency and is servicing few to no other types of packets. The IRL ping mechanism periodically sends a transaction, e.g., a ping packet, onto the fabric. When it does, it snaps the current switch timestamp. The ping packet is a simple read request packet that becomes a simple read response when returned like any other transaction. As its payload is minimal, the ping packet does not affect any endpoints. Its only behavior is to be forwarded towards a selected target, and upon reaching the target switch port, get looped back to the source of the transaction as a response. When the ping response arrives back at the source, it is time-stamped, and the difference between the request and response times is calculated. This delta time can be consumed raw or filtered (Exp_Mov_Avg) by respective IRL instances.

An important advantage to using a built-in hardware IRL ping mechanism is that the latency measurement need not be constrained to power-on initialization. The IRL ping mechanism can also be used dynamically to determine latencies while the system is in an operational state. This would allow a more sophisticated IRL adaption mechanism to be used. Once the various latencies of interest are determined, software/ucode, such as those running on a system host processor or an embedded microcontroller in switch chips that monitor fabric behavior/performance, can use them to configure various IRL settings.

Based on the parameters such as the base latency of the interconnect fabric and a topology of the interconnect fabric, the IRL mode is selected. In the illustrated embodiment, either the static IRL or the adaptive IRL is selected. It is understood that the IRL mode selection can also be based on the goal or objective of the operator such as prevention of interference between endpoints, for which the static IRL is selected, or efficiency in interconnect fabric usage, for which the adaptive IRL is selected.

At step 820, data between endpoints over the interconnect fabric are monitored. Each device receives data that are associated with the directly connected endpoints using respective pipelines such as 322, 324 in FIG. 3. Data include request packets such as read request packets, which request to read data from another endpoint, and write request packets, which request to write data to another endpoint, and response packets. Also during step 820, a number of request credits corresponding to the size of the request and response packets are subtracted from a respective credit counter of the source endpoint, such as 612 in FIG. 6.

At step 830, an injection rate, at which data is injected into the interconnect fabric, is controlled using static and adaptive IRL limiters, such as 610, 620 in FIG. 6. Based on the IRL mode selected at step 610, a different limiter may be used to statically or adaptively limit the directly connected endpoint's ability to make a new data request. As described above, the static IRL can control the injection rate by refilling a credit counter pseudo-non-deterministically using a static data injection threshold, and adaptive IRL can control the injection rate by refilling a credit counter pseudo-non-deterministically using a data injection threshold that is adaptive to a congestion level of the interconnect fabric. The method 800 ends at step 835.

Figure 9:
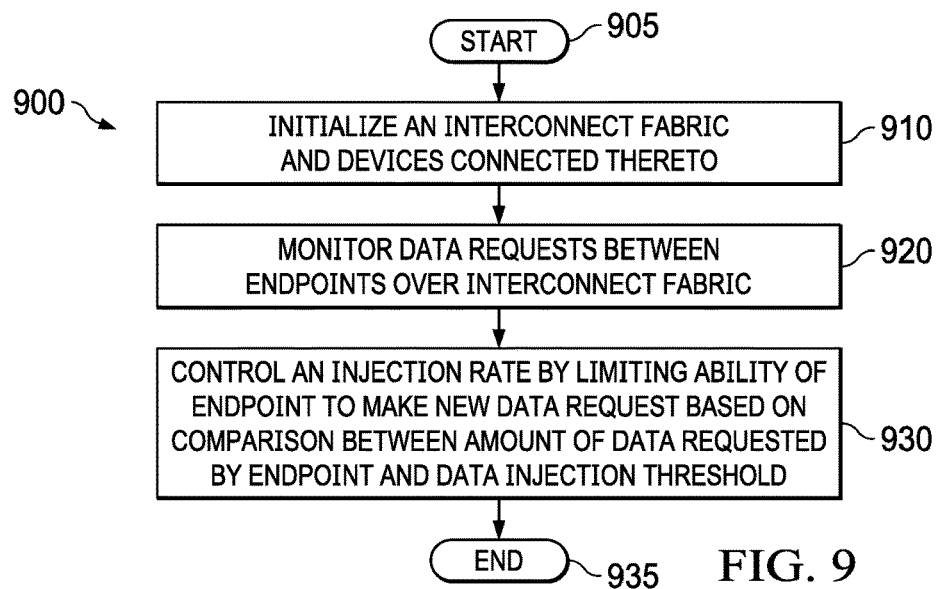
FIG. 9 is a flow chart of another embodiment of an IRL method carried out according to the principles of the disclosure.

FIG. 9 illustrates a flow diagram of another embodiment of the injection rate limiting method 900. The method 900 may be performed by IRL a device located at an edge of the interconnect fabric, such as the switch 200 in FIG. 2. The method 900 starts at step 905.

At step 910, the interconnect fabric and endpoints connected thereto are initialized. The step 910 includes enabling switching devices that are located at the edges of the interconnect fabric to perform the injection rate limiting. Also included in the 910 is parameterizing the interconnect fabric. Parameters such as a base latency and data injection thresholds are determined. Unlike the method 800, the method 900 operates under one mode, and thus no IRL mode selection is made at the step 910.

At step 920, data between the endpoints over the interconnect fabric are monitored. Each device monitors request and response packets that are associated with the directly connected endpoints using respective pipelines such as 322, 324 in FIG. 3. Data request may be either a read or write request packet.

During the step 920, for each request packet being injected into the interconnect fabric, an amount of requested data by each request packet is accumulated in an accumulator. A number of request credits that corresponds to the size of the request and response packets are also subtracted from a respective credit counter, e.g., request or response credit counter, for the source endpoint during the step 920.

Figure 10:
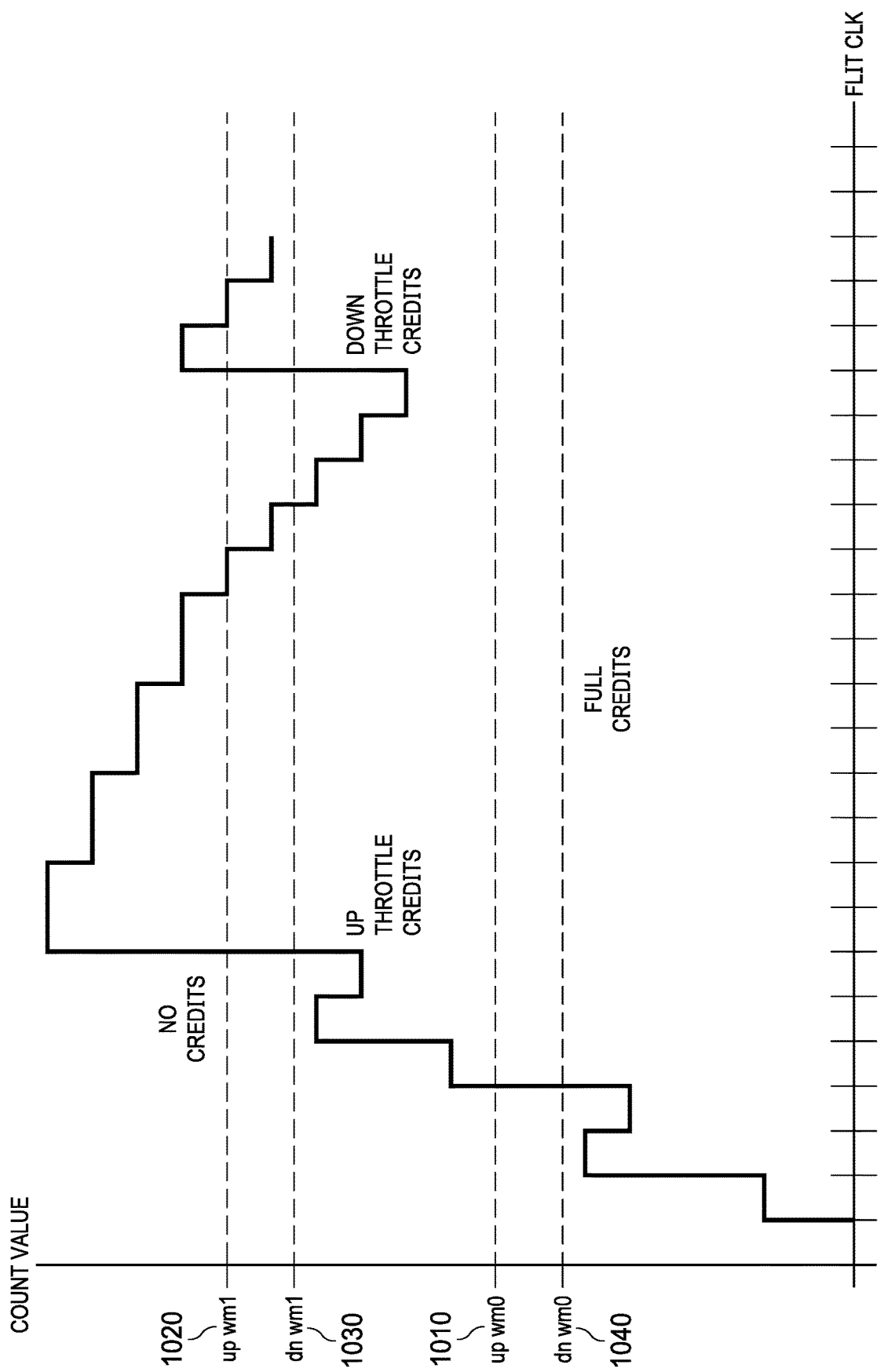
FIG. 10 is a diagram of multiple data injection thresholds according to the principles of the disclosure.

At step 930, an injection rate, at which data is injected into the interconnect fabric, is controlled. In the illustrated embodiment, the IRL submodules limit a directly connected endpoint's ability to make a new data request based on a comparison between the value of the accumulator and multiple data injection THs. FIG. 10 illustrates how the step 930 is performed using two upward and two downward data injection thresholds.

When the first upward TH (up wml) 1010 is crossed on an upward trajectory, an amount of credit that is returned to the source endpoint or the credit counter thereof is reduced by a first programmable amount from the full amount. When the second upward TH 1020 is crossed on an upward trajectory, the amount is further reduced and no credit is returned.

When no new request is made for a predefined time period, e.g., one cycle, the value of the accumulator is decremented by a programmable amount. When the value of the accumulator crosses the first (high) downward TH 1030 on a downward trajectory, the amount of credit return is increased by a programmable amount. When the value crosses the second (low) downward TH 1040 on a downward trajectory, the amount of credit return is restored to the full (initial) amount. The purpose of the down trajectory watermarks is to allow the application of hysteresis function.

In one embodiment, the credits are returned to the source endpoints based on a round-trip time (RTT) of the corresponding request. While the request is detected in the ingress pipeline of a first-hop switch before reaching the route block, the credit return process does not start until the route block begins popping the packets from its buffers. When the credits are available, an appropriate number is returned per RTT time. The read and write control loop are made relatively independent in the embodiment. The method 900 ends at step 935.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method for managing throughput in an interconnect fabric that connects endpoints of a system, comprising:
   monitoring data requests between said endpoints over said interconnect fabric; and
   controlling an injection rate at which new data is injected into said interconnect fabric by limiting an ability of at least one of said endpoints to make a new data request over said interconnect fabric,
   wherein said limiting includes changing a refill rate, at which a credit counter for said at least one of said endpoints is refilled, based on a comparison between a randomly generated number and an injection threshold, wherein said comparison does not involve a count of said credit counter, said changing includes adjusting said credit counter when said randomly generated number is within said injection threshold, and said injection threshold is adaptive to a congestion level of said interconnect fabric.

2. The method of claim 1, wherein said changing includes adaptively reducing said refill rate by reducing said injection threshold.

3. The method of claim 1, wherein said changing includes increasing said refill rate by periodically increasing said injection threshold.

4. The method of claim 1, wherein said credit counter is adjusted by incrementing said credit counter, and wherein said randomly generated number is within said injection threshold when said randomly generated number is less than said injection threshold.

5. The method of claim 1, wherein said new data request is injected into said interconnect fabric when a value of said credit counter is greater than or equal to a maximum transmission unit of a packet and said new data request is prevented from being injected into said interconnect fabric when said value of said credit counter is less than said maximum transmission unit.

6. The method of claim 1, wherein said credit counter includes a request credit counter and a response credit counter, and said limiting includes limiting, using said response credit counter, an ability of said at least one of said endpoints to make a new data read request over said interconnect fabric independently from an ability of said at least one of said endpoints to make a new data write request over said interconnect fabric.

7. The method of claim 2, wherein said congestion level is determined based on a congestion feedback and a local congestion estimate.

8. The method of claim 2, wherein said reducing includes reducing said injection threshold when a response to a data request arrives while a blackout period is over.

9. The method of claim 7, wherein an amount by which said injection threshold is reduced is determined using an accumulation of said congestion feedback during a blackout period and said local congestion estimate.

10. The method of claim 7, wherein said congestion feedback is determined by calculating a latency average of said data requests and comparing said latency average to a programmable latency threshold.

11. The method of claim 7, wherein said congestion feedback is calculated by a last switch before a target endpoint of a data request.

12. The method of claim 7, wherein said local congestion estimate is determined by calculating a transaction latency and comparing said transaction latency to a local congestion threshold.

13. The method of claim 12, wherein said local congestion threshold is set based on a base latency, which is a time period for a ping packet from one endpoint of said endpoints to reach another endpoint of said endpoints and arrive back at said one endpoint when said interconnect fabric is idle.

14. The method of claim 12, wherein said transaction latency is calculated based on a number of outstanding requests of said data requests and an average time between arrivals of responses to said outstanding requests.

15. The method of claim 12, wherein said transaction latency is calculated iteratively without using a multiplication.

16. The method of claim 13, wherein said base latency is measured when said injection rate is initialized.

17. The method of claim 1, wherein said injection rate includes a first injection rate at which new first traffic class data is injected into said interconnect fabric and a second injection rate at which new second traffic class data is injected into said interconnect fabric.

18. The method of claim 17, wherein said first and second injection rates are associated with a same port of said interconnect fabric.

19. A device for managing throughput in an interconnect fabric that connects endpoints of a system, comprising:
   a pipeline configured to monitor data requests between said endpoints over said interconnect fabric; and
   an injection rate limiter configured to control an injection rate at which new data is injected into said interconnect fabric by limiting an ability of at least one of said endpoints to make a new data request over said interconnect fabric,
   wherein said limiting includes:
      changing a refill rate, at which a credit counter for said at least one of said endpoints is refilled, based on a comparison between a randomly generated number and an injection threshold, wherein said comparison does not involve a count of said credit counter, said changing includes adjusting said credit counter when said randomly generated number is within said injection threshold, and the injection threshold is adaptive to a congestion level of said interconnect fabric.

20. The device of claim 19, wherein said changing includes adaptively reducing said refill rate by reducing said injection threshold.

21. The device of claim 19, wherein said changing includes increasing said refill rate by periodically increasing said injection threshold.

22. The device of claim 19, wherein said credit counter is adjusted by incrementing said credit counter, and wherein said randomly generated number is within said injection threshold when said randomly generated number is less than said injection threshold.

23. The device of claim 19, wherein said new data request is injected into said interconnect fabric when a value of said credit counter is greater than or equal to a maximum transmission unit of a packet and said new data request is prevented from being injected into said interconnect fabric when said value of said credit counter is less than said maximum transmission unit.

24. The device of claim 19, wherein said credit counter includes a request credit counter and a response credit counter, and said limiting includes limiting, using said response credit counter, an ability of said at least one of said endpoints to make a new data read request over said interconnect fabric independently from an ability of said at least one of said endpoints to make a new data write request over said interconnect fabric.

25. The device of claim 20, wherein said congestion level is determined based on a congestion feedback and a local congestion estimate.

26. The device of claim 20, wherein said reducing includes reducing said injection threshold when a response to a data request arrives while a blackout period is over.

27. The device of claim 25, wherein an amount by which said injection threshold is reduced is determined using an accumulation of said congestion feedback during a blackout period and said local congestion estimate.

28. The device of claim 25, wherein said congestion feedback is determined by calculating a latency average of said data requests and comparing said latency average to a programmable latency threshold.

29. The device of claim 25, wherein said congestion feedback is calculated by a last switch before a target endpoint of a data request.

30. The device of claim 25, wherein said local congestion estimate is determined by calculating a transaction latency and comparing said transaction latency to a local congestion threshold.

31. The device of claim 30, wherein said local congestion threshold is set based on a base latency, which is a time period for a ping packet from one endpoint of said endpoints to reach another endpoint of said endpoints and arrive back at said one endpoint when said interconnect fabric is idle.

32. The device of claim 31, wherein said base latency is measured when said injection rate limiter is initialized.

33. The device of claim 30, wherein said transaction latency is calculated based on a number of outstanding requests of said data requests and an average time between arrivals of responses to said outstanding requests.

34. The device of claim 30, wherein said transaction latency is calculated iteratively without using a multiplication.

35. The device of claim 24, wherein said limiting includes limiting, using said request credit counter, an ability of at least one of said endpoints to make a new data write read request over said interconnect fabric independently from said ability of at least one of said endpoints to make said new data read request.

36. The device of claim 19, wherein said injection rate includes a first injection rate at which new first traffic class data is injected into said interconnect fabric and a second injection rate at which new second traffic class data is injected into said interconnect fabric.

37. The device of claim 36, wherein said first and second injection rates are associated with a same port of said interconnect fabric.

* * * * *